H. L. BORNMAN.
BUCKSAW.
APPLICATION FILED JAN. 14, 1909.
934,499.
Patented Sept. 21, 1909.
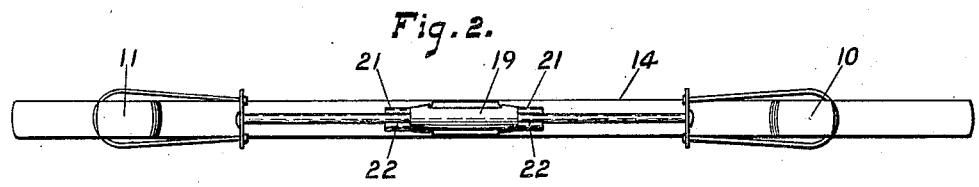
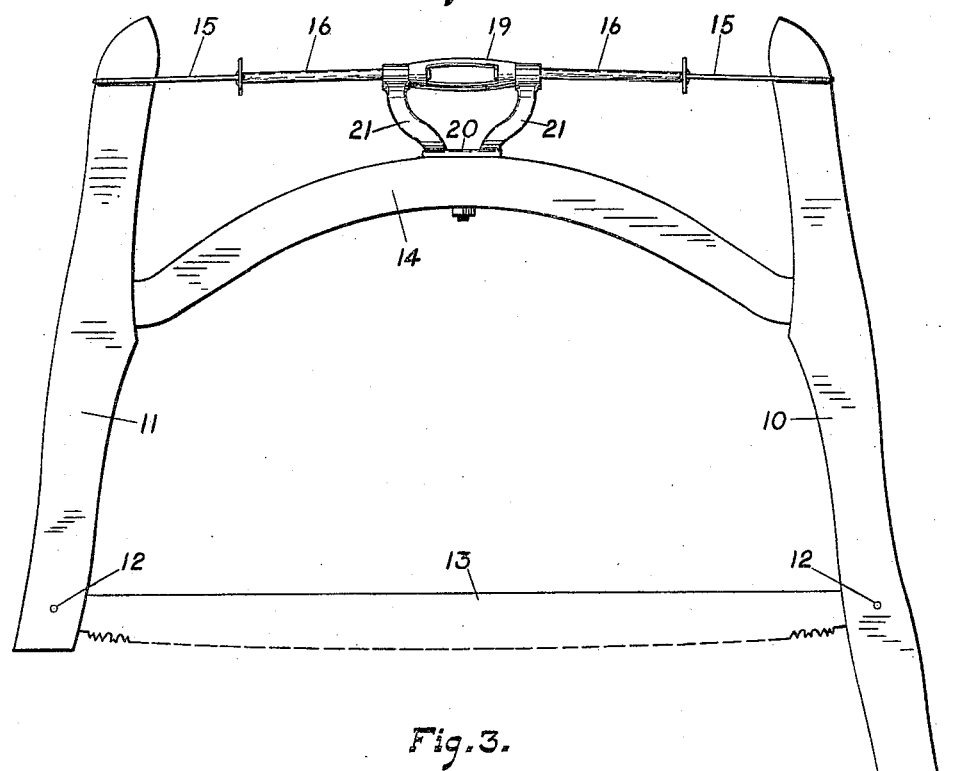
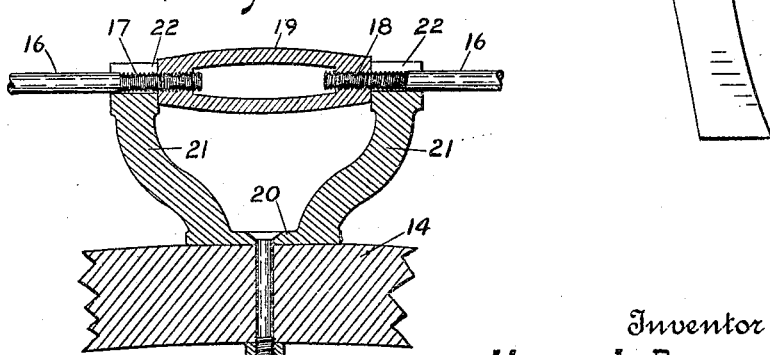
Witnesses
Walter Troemel.
Thomas W. McMeans.
Inventor
Henry L. Bornman.
Bradford & Hood.
Attorney

UNITED STATES PATENT OFFICE.

HENRY L. BORNMAN, OF INDIANAPOLIS, INDIANA, ASSIGNOR TO E. C. ATKINS & COMPANY, OF INDIANAPOLIS, INDIANA, A CORPORATION OF INDIANA.

BUCKSAW.

934,499.  Specification of Letters Patent.  Patented Sept. 21, 1909.

Application filed January 14, 1909.  Serial No. 472,235.

*To all whom it may concern:*

Be it known that I, HENRY L. BORNMAN, a citizen of the United States, residing at Indianapolis, in the county of Marion and State of Indiana, have invented certain new and useful Improvements in Bucksaws, of which the following is a specification.

In the ordinary buck saw the saw blade is placed under tension by means of tension rods acting upon the upper ends of the end pieces of the frame, swinging said end pieces upon the ends of the cross bar, and in such construction, if an attempt is made to place the saw blade under very high tension, there is a tendency toward twisting of the cross piece which places the saw blade on a twist and renders its operation difficult and unsatisfactory.

The object of my present invention is to produce a buck saw frame by means of which the saw blade may be put under a very decided tension in such manner however as to avoid any twisting of the frame.

The accompanying drawings illustrate my invention.

Figure 1 is a side elevation of a buck saw embodying my invention; Fig. 2 a plan, and Fig. 3 a sectional detail on a larger scale.

In the drawings, 10 indicates the handle end piece and 11 the opposite end piece of the frame, said pieces being of any ordinary or desirable form and each provided with a pin 12 by means of which an ordinary blade 13 may be connected between the end pieces 10 and 11. Extending between the end pieces 10 and 11, in the usual manner, is a cross piece 14 which, however, instead of being straight as is usual, is arched upwardly away from the saw blade. Slipped over the upper end of each of the end pieces 10 and 11 is an eye or yoke 15, of usual form and each of these yokes carries a tension rod 16 the inner adjacent ends of which are oppositely threaded as at 17, 18, and connected by a turn-buckle 19. So far as the tension member proper is concerned, comprising the parts 15, 16, 19, there is nothing especially different from ordinary practice, but secured to the upper side of the arched cross bar 14, is a bracket 20 provided with a pair of upwardly extending spreading arms 21, 21 each of which, at its upper end, is provided with a slot or seat 22 into which the inner end of a tension rod 16 may be readily dropped. The ends of the arms 21 are spaced apart a distance substantially equal to the length of the turn buckle 19 so that said turn buckle may lie easily between the ends of said arms. By arching bar 14 bracket 21 may be comparatively short and hence transversely rigid and yet the lengths of arms 10 and 11 above the cross bar may be enough to permit the exertion of considerable power upon the saw blade by means of the tension rods. In addition to this, the arching of the cross bar 14 increases its stiffness to resist any sidewise displacement which would tend to twist the saw blade. By mounting the turn buckle between the two arms 21 any rotation of the turn buckle will equally affect both tension rods and, the turn buckle being fixed longitudinally of the tension rods, the upper ends of pieces 10 and 11 of the frame will be equally affected and the saw blade thus maintained in its desired relationship to the frame members.

I claim as my invention:—

1. A buck saw comprising end pieces, a connecting cross bar, tension members connecting the upper ends of the end pieces and comprising means for shortening and lengthening same, and a strut secured to the cross bar and engaging the tension members.

2. A buck saw comprising end pieces, a connecting upwardly arched cross bar, tension members connecting the upper ends of the end pieces and comprising means for shortening and lengthening same, and a strut secured to the cross bar and engaging the tension members.

3. A buck saw comprising end pieces, a connecting cross bar, a pair of tension rods each connected to the upper end of one end piece and having their inner adjacent ends oppositely threaded, a turn buckle mounted on said threaded ends, and a strut arranged between the inner ends of the tension rods and the cross bar and engaging the turn buckle to limit longitudinal movement thereof, substantially as described.

4. A buck saw comprising end pieces, a connecting upwardly arched cross bar, a pair of tension rods each connected to the upper end of one end piece and having their inner adjacent ends oppositely threaded, a turn buckle mounted on said threaded ends, and a strut secured to the cross bar and arranged between the inner ends of the tension rods and the cross bar and engaging the turn buckle to limit longitudinal movement thereof, substantially as described.

5. A buck saw comprising end pieces, a connecting cross bar, a pair of tension rods each connected to the upper end of one end piece and having their inner adjacent ends oppositely threaded, a turn buckle mounted on said threaded ends, and a strut secured to the cross bar and arranged between the inner ends of the tension rods and the cross bar and engaging the turn buckle to limit longitudinal movement thereof, said strut having open pockets to receive the tension rods, substantially as described.

6. A buck saw comprising end pieces, a connecting upwardly arched cross bar, a pair of tension rods each connected to the upper end of one end piece and having their inner adjacent ends oppositely threaded, a turn buckle mounted on said threaded ends, and a strut secured to the cross bar and arranged between the inner ends of the tension rods and the cross bar and engaging the turn buckle to limit longitudinal movement thereof, said strut having open pockets to receive the tension rods, substantially as described.

In witness whereof, I have hereunto set my hand and seal at Indianapolis, Indiana, this eleventh day of January, A. D. one thousand nine hundred and nine.

HENRY L. BORNMAN. [L. S.]

Witnesses:
 ARTHUR M. HOOD,
 THOMAS W. McMEANS.